United States Patent
Iwahara (10) Patent No.: US 10,911,703 B2
(45) Date of Patent: Feb. 2, 2021

(54) IMAGE SENSOR AND CONTROL METHOD THEREOF, AND IMAGE CAPTURING APPARATUS WITH EVENT COUNTERS AND REVERSE BIAS VOLTAGES

(71) Applicant: CANON KABUSHIKI KAISHA, Tokyo (JP)

(72) Inventor: Tomonaga Iwahara, Atsugi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/525,744

(22) Filed: Jul. 30, 2019

(65) Prior Publication Data

US 2020/0045257 A1 Feb. 6, 2020

(30) Foreign Application Priority Data

Aug. 6, 2018 (JP) .................................. 2018-148020

(51) Int. Cl.
| | |
|---|---|
| *H04N 5/369* | (2011.01) |
| *H04N 9/04* | (2006.01) |
| *H04N 5/361* | (2011.01) |
| *H04N 9/73* | (2006.01) |

(52) U.S. Cl.
CPC ........... *H04N 5/3698* (2013.01); *H04N 5/361* (2013.01); *H04N 9/04551* (2018.08); *H04N 9/735* (2013.01)

(58) Field of Classification Search
CPC .. H04N 5/3698; H04N 9/04551; H04N 9/735; H04N 5/361; H04N 5/37455
See application file for complete search history.

(56) References Cited

U.S. PATENT DOCUMENTS

2017/0131143 A1* 5/2017 Andreou ........... H01L 31/02027
2018/0266881 A1* 9/2018 Fujiwara .................. G01V 8/10

FOREIGN PATENT DOCUMENTS

JP        2014-081254 A        5/2014

* cited by examiner

*Primary Examiner* — Padma Haliyur
(74) *Attorney, Agent, or Firm* — Cowan, Liebowitz & Latman, P.C.

(57) ABSTRACT

An image sensor comprises: a plurality of light receiving elements whose output voltages vary in response to a photon entering; a plurality of counters each counts a number of events in which the output voltage changes beyond a predetermined threshold, and outputs a count value; and a voltage source that applies a plurality of different reverse bias voltages which are equal to or higher than a breakdown voltage to the plurality of light receiving elements.

15 Claims, 7 Drawing Sheets

IMAGE SENSOR AND CONTROL METHOD THEREOF, AND IMAGE CAPTURING APPARATUS WITH EVENT COUNTERS AND REVERSE BIAS VOLTAGES

BACKGROUND OF THE INVENTION

Field of the Invention

The present invention relates to an image sensor and a control method thereof, and an image capturing apparatus.

Description of the Related Art

Recent years have seen investigations into an image sensor that use an avalanche phenomenon (avalanche breakdown) occurring when avalanche photodiodes (APDs) are operated in Geiger mode. In this type of image sensor, an observable current is produced by avalanche multiplication when a single photon enters the APD, and by converting the current with predetermined reference voltage and counting the number of pulse signals generated when the current exceeds the reference voltage, a digital value is output.

On the other hand, conventionally used CMOS image sensors typically employ a charge accumulation method, in which charge generated in a photodiode (PD) is transferred to a floating diffusion (FD) unit, where the charge is converted into voltage and stored. With this method, it is known that when the voltage in the FD is amplified by a source-follower (SF) and output to an A/D converter outside of the pixel, the S/N ratio drops due to Random Telegraph Signal (RTS) noise produced at the boundary of the SF gate.

By contrast, since the RTS noise is not produced in an image sensor employing APDs, an improvement in the S/N ratio can be anticipated. Japanese Patent Laid-Open No. 2014-81254 discloses a time-of-flight (TOF) type distance-measurement sensor constituted by the APDs as an example of a device employing APDs.

It is known that the occurrence probability of avalanche multiplication in the above-described APD is dependent on applied voltage. The larger reverse bias voltage is applied across the APD, the higher the probability of occurrence of avalanche multiplication, that is, the sensitivity to incident light becomes. On the other hand, there is a problem that the dead time when one photon enters the APD becomes longer as the applied voltage increases, and the count rate (sensitivity, saturation) of the APD is limited.

Furthermore, when the APD is applied to an image sensor having a general Bayer-arranged color filter, the numbers of photons incident on the APDs vary pixel by pixel due to the difference in color, that is, the spectral transmittance, and the sensitivity and saturation also vary.

SUMMARY OF THE INVENTION

The present invention has been made in consideration of the above situation, and improve quality of an image obtained by a photon counting type image sensor, such as APDs.

According to the present invention, provided is an image sensor comprising: a plurality of light receiving elements whose output voltages vary in response to a photon entering; a plurality of counters each counts a number of events in which the output voltage changes beyond a predetermined threshold, and outputs a count value; and a voltage source that applies a plurality of different reverse bias voltages which are equal to or higher than a breakdown voltage to the plurality of light receiving elements.

Further, according to the present invention, provided is an image capturing apparatus comprising: an image sensor which comprises: a plurality of light receiving elements whose output voltages vary in response to a photon entering; a plurality of counters each counts a number of events in which the output voltage changes beyond a predetermined threshold, and outputs a count value; and a voltage source that applies a plurality of different reverse bias voltages which are equal to or higher than a breakdown voltage to the plurality of light receiving elements; and a corrector that corrects the count values based on the reverse bias voltage applied to the light receiving elements.

Furthermore, according to the present invention, provided is a control method of an image sensor which comprises: a plurality of light receiving elements whose output voltages vary in response to a photon entering; and a plurality of counters each counts a number of events in which the output voltage changes beyond a predetermined threshold, and outputs a count value, the method comprising: controlling to apply a plurality of different reverse bias voltages which are equal to or higher than a breakdown voltage to the plurality of light receiving elements.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
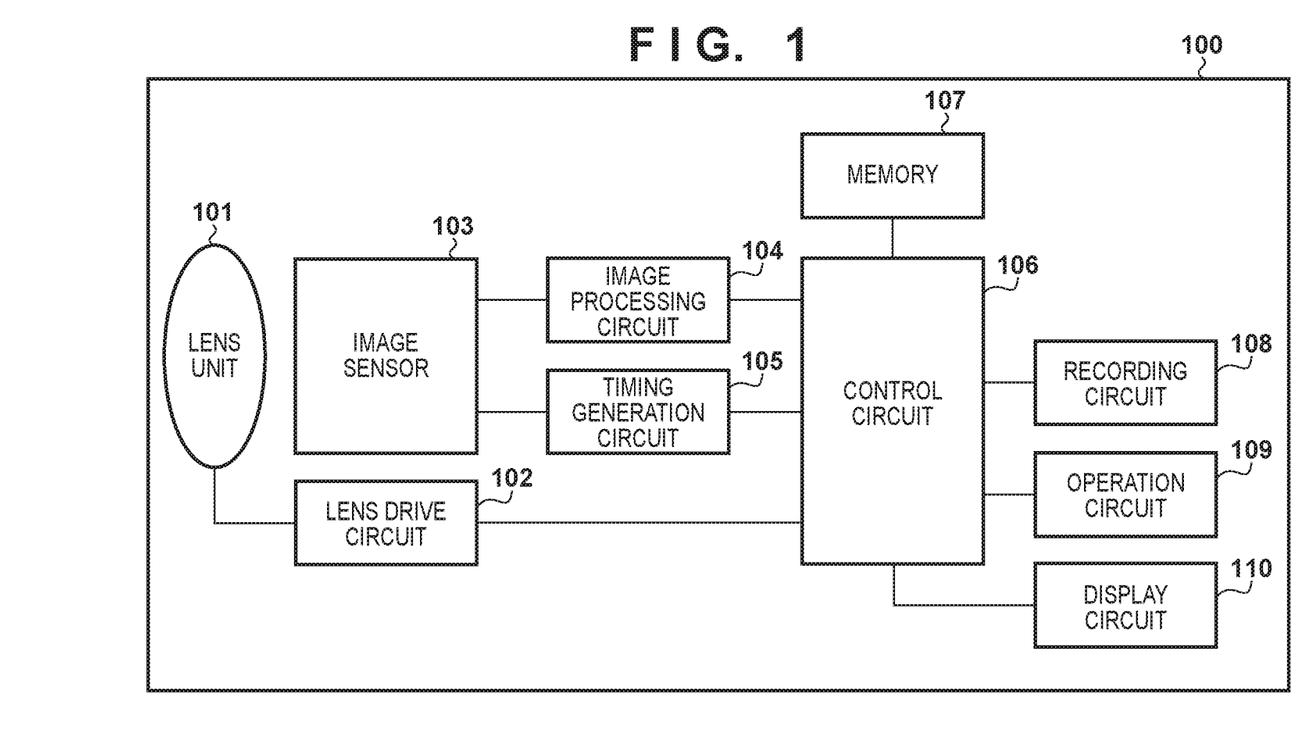
FIG. 1 is a block diagram showing a schematic configuration of an image capturing apparatus according to an embodiment of the present invention.

A first embodiment of the present invention will be described. FIG. 1 is a block diagram showing a schematic configuration of an image capturing apparatus 100 in the first embodiment.

In FIG. 1, a lens drive circuit 102 performs zoom control, focus control, aperture control, and the like of a lens unit 101 to form an optical image of a subject on an image sensor 103. The image sensor 103 captures the image of the subject formed by the lens unit 101 as an image signal, and an image processing circuit 104 performs various corrections, development processing, operations for data compression, and so on, on the image signal output from the image sensor 103.

A timing generation circuit 105 outputs various timing signals to the image sensor 103 for driving. A control circuit 106 performs various operations, and controls and monitors the overall image capturing apparatus 100. A memory 107 temporarily stores image data. A recording circuit 108 performs recording or reading on/from a removable recording medium such as a semiconductor memory. An operation circuit 109 receives an instruction from the user, and a display circuit 110 displays various information and a captured image.

Figure 2A:
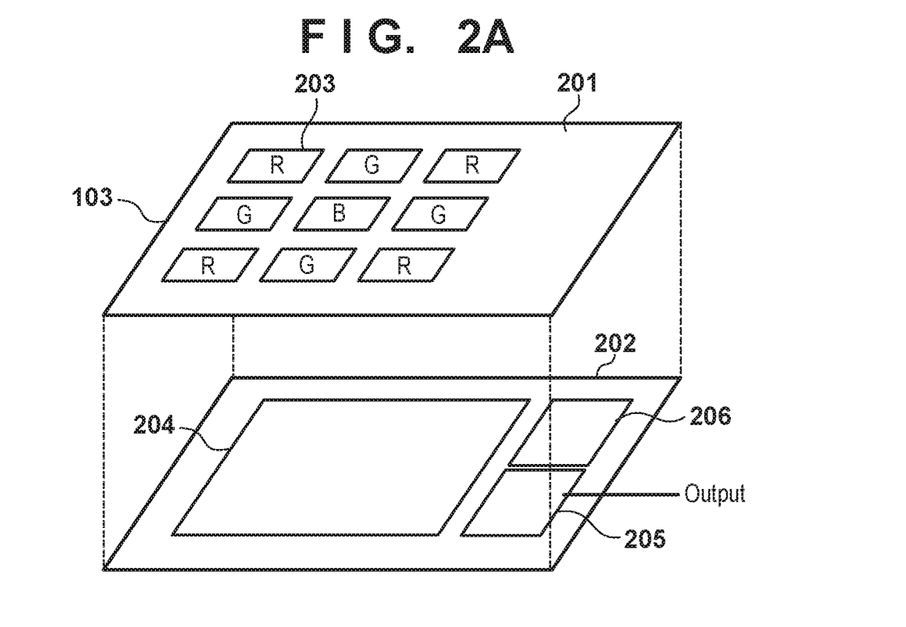
FIG. 2A and FIG. 2B are block diagrams of an image sensor according to the embodiment.
Figure 2B:
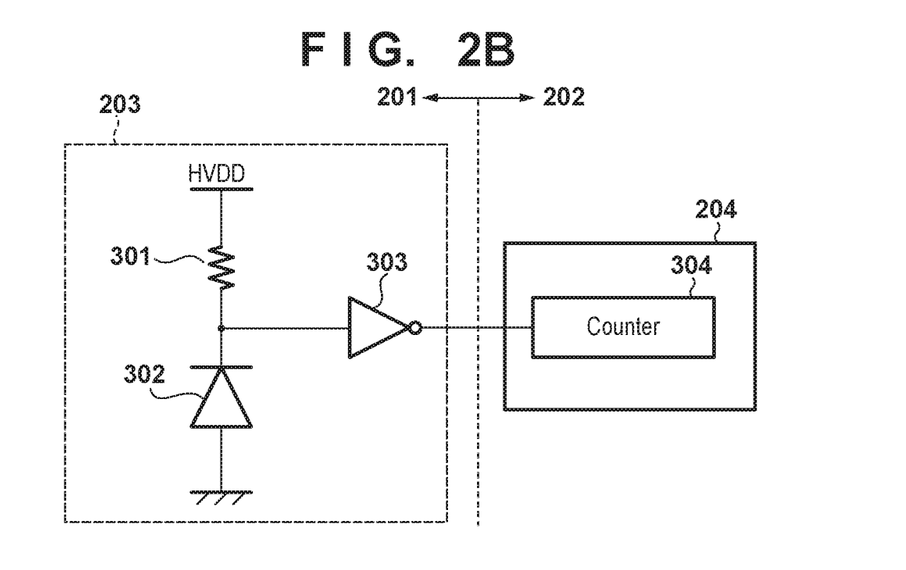

Next, the image sensor 103 in the first embodiment will be described with reference to FIGS. 2A and 2B. FIG. 2A is a schematic configuration diagram of the image sensor 103, which has a stacked structure in which a sensor substrate 201 and a circuit substrate 202 are stacked to each other. In this embodiment, although the image sensor 103 shall have a stacked structure, the present invention is not limited to this, and a single layer structure may be used as long as the structure has the same function.

On the sensor substrate 201, a pixel array in which a plurality of pixels 203 are arranged in matrix is formed, and in the pixels 203, for example, color filters of R (red), G (green) and B (blue) are formed.

In the circuit substrate 202, a pixel control unit 204, a signal processing circuit 205, and a substrate memory 206 are formed. The pixel control unit 204 is electrically connected to each pixel 203 of the sensor substrate 201 by a bump or the like, outputs a control signal for driving each pixel 203, and receives a pulse waveform which is a buffer output from each pixel 203.

The pixel control unit 204 is provided with counters, each determines the presence or absence of a photon by comparing the threshold value Vth set in advance with the output of the corresponding pixel 203 and counts the number of incident photons. More specifically, the counter counts the number of pulse waveforms that change over the threshold value Vth.

The count values counted by the pixel control unit 204 are output to the outside of the image sensor 103 by the signal processing circuit 205. The substrate memory 206 is a volatile memory such as a DRAM, and is used to temporarily hold data when processing a signal from the pixel control unit 204 with the signal processing circuit 205.

Next, the configuration of the pixel 203 will be described. FIG. 2B is an equivalent circuit diagram of the pixel 203 formed in the sensor substrate 201. The pixel 203 includes a quenching resistor 301, an avalanche photodiode (APD) 302 (light receiving element), and a buffer 303. A reverse bias voltage with the potential HVDD is applied to the APD 302 via the quenching resistor 301. The potential HVDD at this time is set such that the reverse bias voltage is equal to or higher than the breakdown voltage of the APD 302 in order to drive the APD 302 in Geiger mode. The output of the buffer 303 is input to a counter 304 in the pixel control unit 204. In the following description, the term "voltage" refers to "reverse bias voltage".

Figure 3:
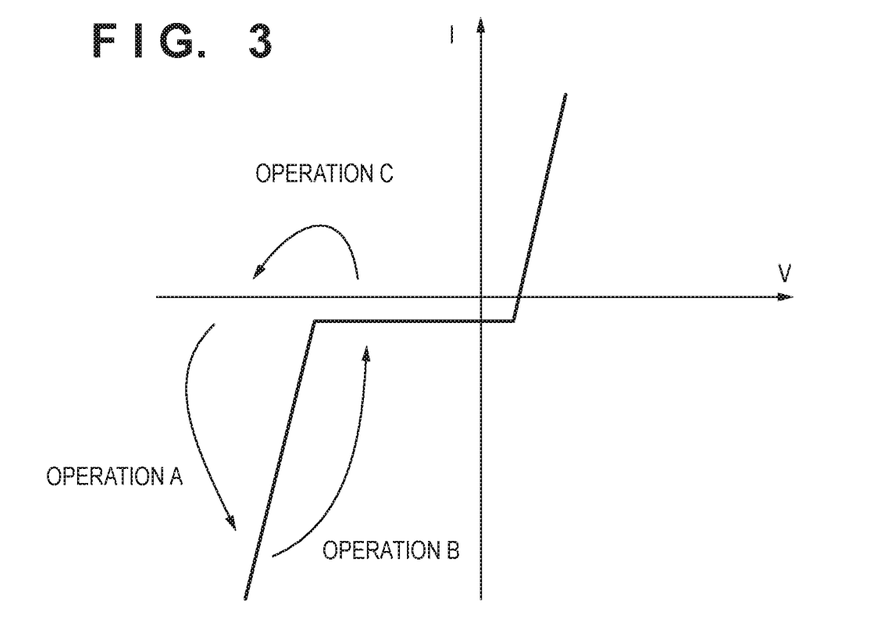
FIG. 3 is a schematic view for explaining a transition when an APD is driven in Geiger mode.

Here, the operation of the pixel 203 when a photon enters the APD 302 will be briefly described with reference to FIG. 3. FIG. 3 shows the current-voltage characteristics of the APD 302.

In the first embodiment, the cathode of the APD 302 is supplied with the potential HVDD for attaining a voltage exceeding the breakdown voltage via the quenching resistor 301, and the APD 302 operates in the Geiger mode.

Here, when a photon enters the APD 302, a large current (photocurrent) flows in the APD 302 caused by avalanche multiplication (operation A). At the same time as this current flows, a voltage starts to drop due to the quenching resistor 301, the voltage applied to the APD 302 becomes less than the breakdown voltage, and the avalanche multiplication stops (operation B).

When the avalanche multiplication stops, the cathode of APD 302 is again charged by the potential HVDD and returns to Geiger mode (operation C). The voltage change at the buffer input terminal due to operations A to C is shaped into a pulse by the buffer 303 and measured by the counter 304. By repeating this, it is possible to measure the number of photons incident on the APD 302.

Figure 4A:
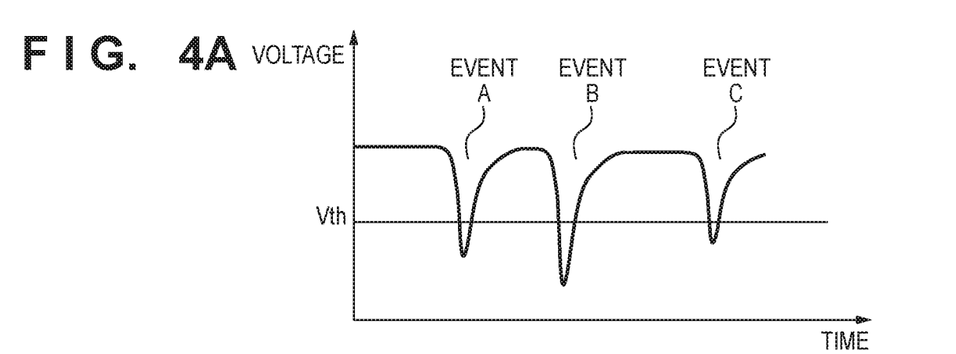
FIGS. 4A and 4B are schematic diagrams showing pulse waveforms when photons enter.
Figure 4B:
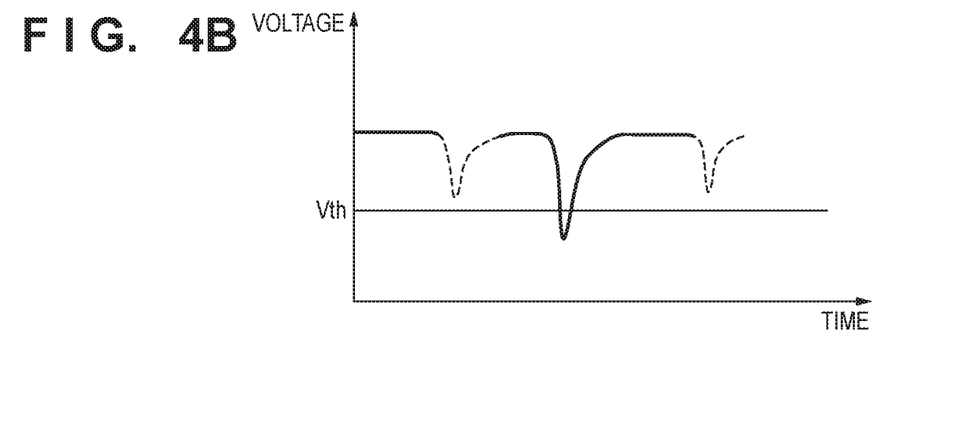

Next, the relationship between the pulse waveform caused by avalanche multiplication and the potential HVDD will be described using FIGS. 4A and 4B. FIGS. 4A and 4B are schematic diagrams showing pulse waveforms of output voltages from the APD 302 at the time of photon incidence, with the horizontal axis as time. In FIGS. 4A and 4B, the vertical axis expresses the output voltage, and the value increases from the bottom to the top in the vertical axis.

FIG. 4A shows the case where the APD 302 is supplied with the potential HVDD capable of applying a reverse bias voltage that sufficiently exceeds the breakdown voltage. At this time, with the photon events A, B, and C in which photons are incident on the APD 302, avalanche multiplication occurs to such an extent that a pulse waveform that changes to exceed the threshold value Vth of the counter is output, and the respective pulses are time-resolved. Thus, in the case of FIG. 4A, the number of photon events is properly counted.

On the other hand, FIG. 4B shows a case where the potential HVDD which causes a reverse bias voltage smaller than that in FIG. 4A is applied to the APD 302. At this time, with respect to the photon events A and C of photons incident on the APD 302, avalanche multiplication which causes a pulse waveform that changes to exceed the threshold value Vth of the counter does not occur. Therefore, some photon events cannot be counted in the case of FIG. 4B.

Thus, the avalanche probability and the magnitude of the pulse output depend on the voltage applied to the APD 302, in other words, the magnitude of the potential HVDD, and the sensitivity (probability) and the saturation characteristics of the image sensor 103 change depending on the potential HVDD.

Figure 5:
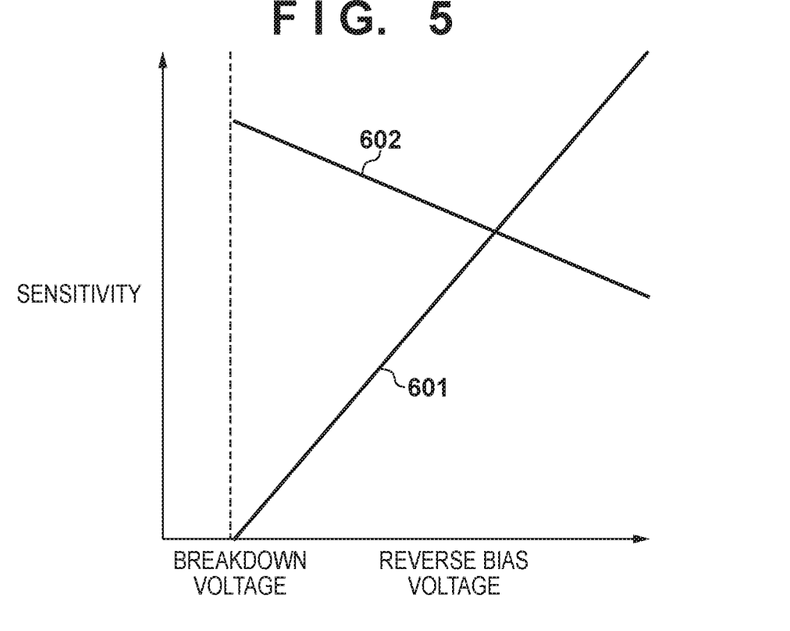
FIG. 5 is a conceptual diagram showing relationship between sensitivity and saturated light amount with respect to reverse bias voltage.

FIG. 5 is a conceptual diagram showing the relationship between the voltage applied to the APD 302 by the potential HVDD, sensitivity 601, and a saturation light amount 602. As described above, the reverse bias voltage increases as the potential HVDD decreases. As shown in FIG. 5, when the voltage shown on the horizontal axis exceeds the breakdown voltage, avalanche multiplication occurs, and the sensitivity 601 also increases as the voltage increases. On the other hand, the saturation light amount 602 tends to decrease as the voltage rises because the pulse detection event increases as the voltage rises.

Figure 6:
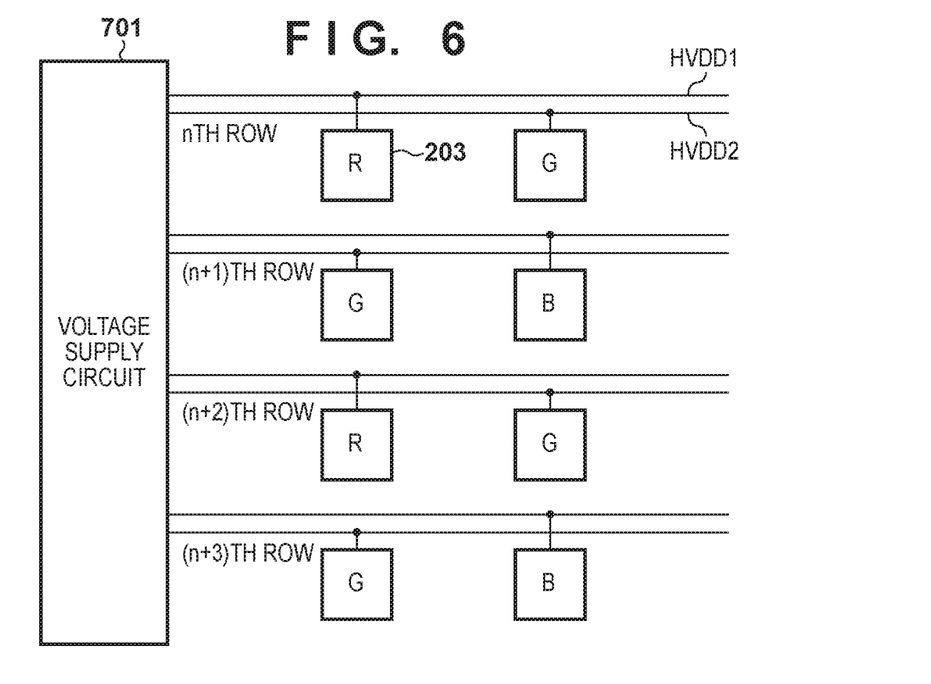
FIG. 6 is a schematic view showing a method of supplying a potential HVDD according to a first embodiment.

FIG. 6 is a schematic view showing a method of supplying the potential HVDD in the first embodiment, and a wiring pattern of a voltage supply circuit 701 which supplies a voltage to each of a plurality of pixels 203 in the sensor substrate 201 on which the Bayer color filter is formed. The voltage supply circuit 701 may be configured on the sensor substrate 201 or may be configured on the circuit substrate 202.

In FIG. 6, a potential HVDD1 is supplied to power supply wirings shown as HVDD1, which are connected to pixels provided with an R (red) color filter in the nth row and a B (blue) color filter in the (n+1)th row are provided. The power supply wirings indicated by HVDD2 are supplied with the potential HVDD2 and connected to pixels provided with a G (green) color filter in the nth row and a pixel provided with a G (green) color filter in the (n+1)th row. The same applies to the (n+2)th and subsequent rows. The same pattern is repeated also in the column direction for the same color.

The potentials HVDD1 and HVDD2 are different from each other. In the present embodiment, the potential HVDD1 is set to be relatively lower than the potential HVDD2 so that the voltage becomes higher. The reason is explained below.

In the image sensor 103 provided with the Bayer array color filter, it is known that the spectral transmittance for white light (gray) of the color filter formed on the pixel 203 is generally largest for the G (green) color filter, and relatively small for the R (red) and B (blue) color filters. That is, the density of photons reaching the APD 302 differs from color to color.

By adjusting the potential HVDD to be supplied for each pixel 203 based on this characteristic, it is possible to cause avalanche multiplication corresponding to the spectral transmittance of the color filter to occur. That is, in the first embodiment, the low potential HVDD1 is supplied to the pixels provided with the R (red) and B (blue) color filters. Thereby, the sensitivity characteristic of the pixels provided with the R (red) and B (blue) color filters is relatively improved as compared with the pixels provided with the G (green) color filter to which the potential HVDD2 is supplied. Accordingly, the low spectral transmittance of the R (red) and B (blue) color filters is compensated.

In this way, even if there is a difference in the density of incident photons depending on the spectral transmittance, by adjusting the sensitivity for each color, it is possible to suppress the noise due to the digital gain in the latter stage, which in turn improves the image quality of the image capturing apparatus 100.

The value of the potential HVDD is determined according to the spectral transmittance of the color filter as described above, however, other than this, if the image capturing apparatus 100 includes a white balance adjustment unit, a color temperature detection unit, and a color temperature setting unit, the value of the potential HVDD may be determined according to white balance gains and color temperature.

In the example described above, from the viewpoint of the type of color filter and the wiring layout, a case where the pixels provided with the G (green) color filter and the pixels provided with the R (red) or B (blue) color filters are supplied different potentials HVDD has been described. However, the present invention is not limited to this. For example, different voltages may be applied to pixels provided with two G (green) color filters arranged diagonally. Further, the voltages supplied to the pixel provided with the R (red) color filter and the pixel provided with the B (blue) color filter may be different.

Furthermore, in consideration of the dark count rate which fluctuates according to the potential HVDD, for example, the threshold value Vth of the counter may be suitably changed so as to maximize S/N ratio.

Further, the image sensor 103 may be driven to correct the output image signal (count value) by acquiring, in advance, sensitivity (avalanche probability) or saturation that changes with respect to the potential HVDD.

Second Embodiment

Next, a second embodiment of the present invention will be described. A configuration of an image capturing apparatus 100 and the schematic configuration of an image sensor 103 in the second embodiment are the same as those described with reference to FIG. 1 and FIGS. 2A and 2B in the first embodiment, and the description thereof is omitted here.

Figure 7A:
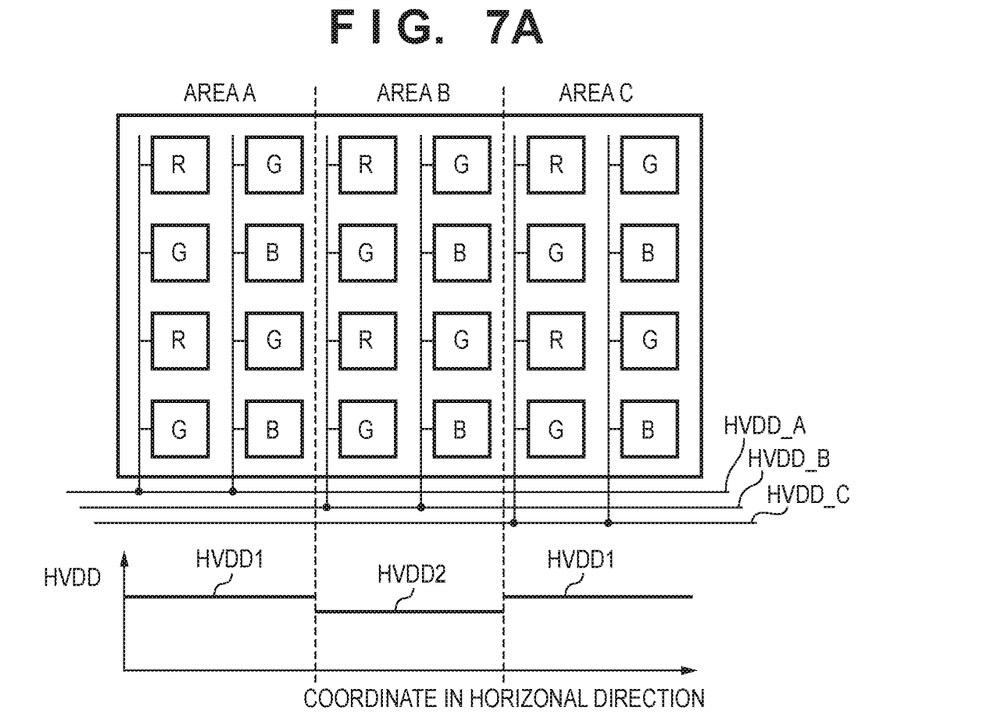
FIGS. 7A and 7B are schematic views showing a method of supplying a potential HVDD according to a second embodiment.
Figure 7B:
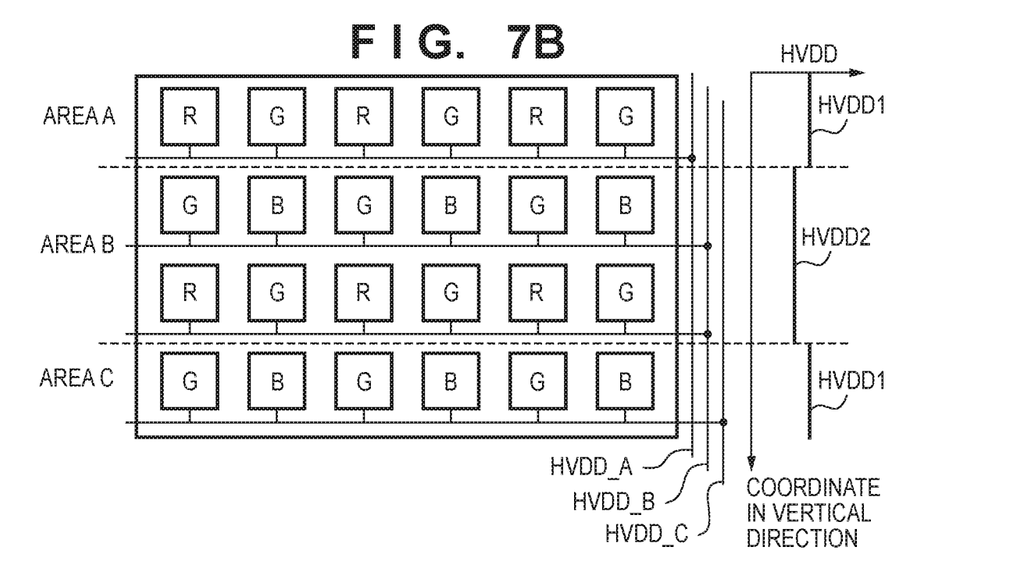

FIGS. 7A and 7B are schematic views showing a method of supplying the potential HVDD in the second embodiment, and show an area division pattern of the plurality of pixels 203 on the sensor substrate 201 to which the potential is supplied.

As shown in FIG. 7A, the sensor substrate 201 is divided into an area A on the left of the screen, an area B on the center of the screen, and an area C on the right of the screen, and pixels 203 in these areas are connected to power supply wirings HVDD_A, HVDD_B and HVDD_C, respectively. Here, all of the pixels in the same area are connected to the same power supply wiring regardless of the type of pixel.

In the second embodiment, the potential HVDD2 is set to the power supply wiring HVDD_B, and the potential HVDD1 relatively lower than the potential HVDD2 is set to the power supply wirings HVDD_A and HVDD_C to apply a higher voltage. The reason of this is explained below.

Since the pixel 203 of the image sensor 103 has a structure which spreads in the direction orthogonal to the optical axis direction, it has the characteristic that the light receiving efficiency of photons physically decreases as the image height is higher with respect to the central portion of the pixel array. The effect of this decrease in marginal illumination generally affects more as the larger the light receiving area is, and the smaller the size of each pixel is. In addition, vignetting of the lens unit 101 and light attenuation due to the cosine fourth law can also be factors in the decrease in sensitivity at the periphery.

With respect to this characteristic, by changing the potential HVDD supplied for each region of the sensor substrate 201, it is possible to cause avalanche multiplication which copes with the decrease in marginal illumination of the image sensor 103 or the peripheral darkening caused by the lens unit 101 to occur. That is, in the second embodiment, by applying a relatively high voltage to the peripheral portion of the screen, the sensitivity characteristic of the peripheral portion is relatively improved with respect to the central portion of the screen, thereby compensating for the decrease in marginal illumination and the peripheral darkening in the horizontal direction.

FIG. 7B is a schematic view showing another method of supplying potential HVDD in the second embodiment, and shows an area division pattern of the pixels 203 in the sensor substrate 201 to which the potential is supplied.

In the example shown in FIG. 7B, the sensor substrate 201 is divided into an area A at the upper part of the screen, an area B at the center of the screen, and an area C at the bottom of the screen, and the pixels 203 of respective areas are connected to different power supply wirings HVDD_A, HVDD_B, and HVDD_C. Here, in the same area, all of the pixels are connected to the same power supply wiring regardless of the type of pixel. Then, the potential HVDD2 is supplied for the power supply wiring HVDD_B, and the potential HVDD1 relatively lower than the HVDD2 is supplied for the power supply wirings HVDD_A and HVDD_C so that a higher voltage is applied.

As described above, also in the example illustrated in FIG. 7B, the sensitivity characteristic is relatively improved with respect to the central portion of the screen to which the potential HVDD2 is supplied by applying a higher voltage by the potential HVDD1 in the peripheral portion of the screen. This compensates for the decrease in marginal illumination and the peripheral darkening in the vertical direction.

As described above, according to the second embodiment, it is possible to suppress the decrease in sensitivity for each area caused by, for example, the optical characteristics of the image sensor 103 with respect to oblique incident light and the characteristics of the decrease in marginal illumination of the lens unit 101. In addition, image quality deterioration due to a correction gain or the like in the subsequent stage can also be suppressed, and as a result, the image quality of the image capturing apparatus 100 can be improved.

In the second embodiment, as shown in FIGS. 7A and 7B, an example in which the area is divided into three is described as an example. However, the present invention is not limited thereto, and only the peripheral portion at high image height may be divided, the area may be divided more finely, or the area may be divided two-dimensionally.

Further, discontinuities of sensitivity (avalanche probability), saturation, or the like, that may occur as dividing the screen into a plurality of areas to which different potentials HVDD are applied may be corrected by the image processing circuit 104.

Third Embodiment

Next, a third embodiment of the present invention will be described. A configuration of an image capturing apparatus 100 and the schematic configuration of an image sensor 103 in the third embodiment are the same as those described with reference to FIG. 1 and FIGS. 2A and 2B in the first embodiment, and the explanation thereof is omitted here.

Figure 8A:
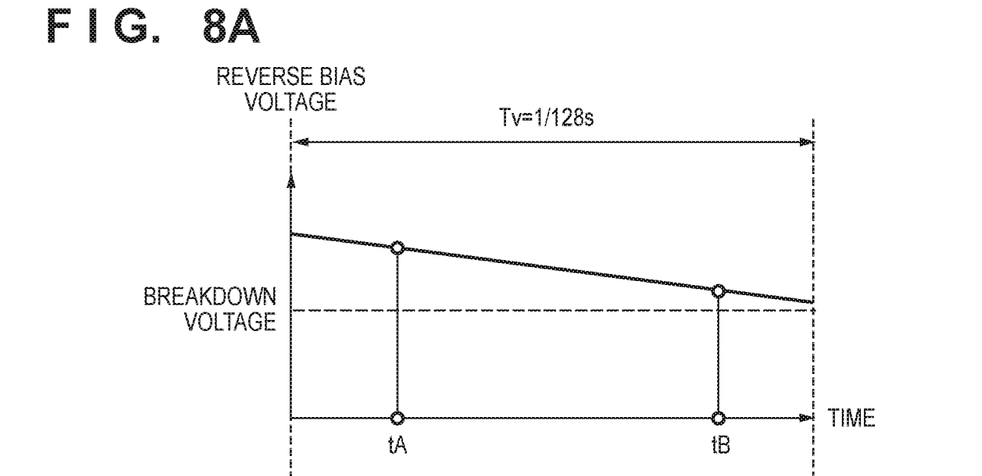
FIGS. 8A to 8C are schematic views showing a method of supplying a potential HVDD according to a third embodiment.
Figure 8B:
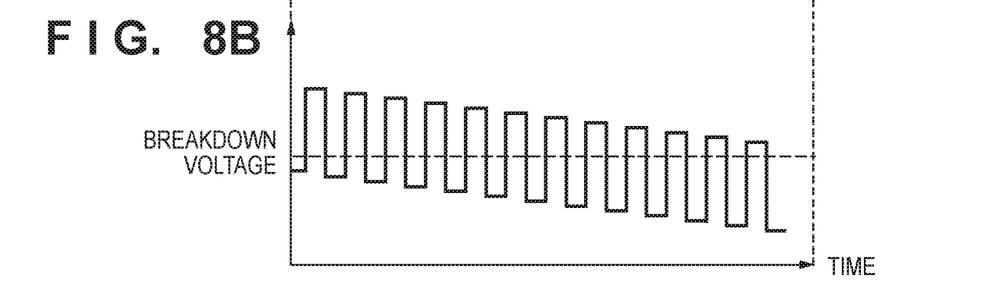
Figure 8C:
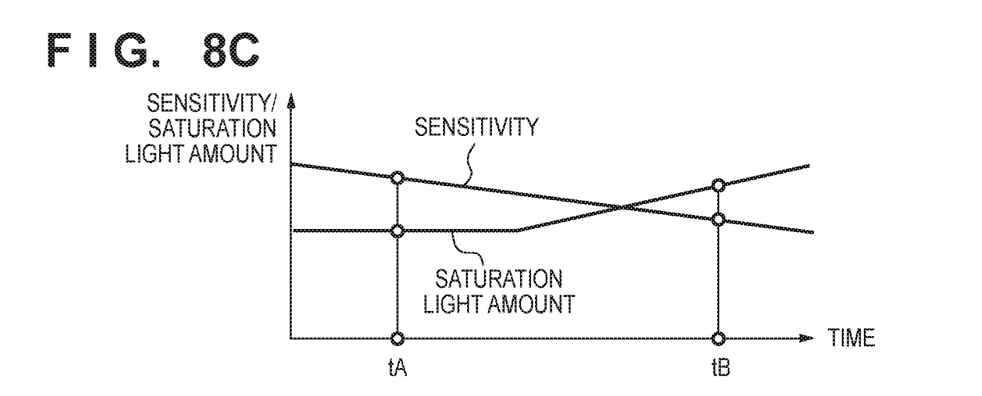

FIGS. 8A to 8C are schematic views showing a method of supplying the potential HVDD in the third embodiment, and show time dependency per unit count time of the potential HVDD to be supplied to the plurality of pixels 203 on the sensor substrate 201. In FIGS. 8A to 8C, the potential HVDD decreases from the bottom to the top of the vertical axis to show, as a result, the reverse bias voltage increases.

In this example, a predetermined counting-time is shown as Tv=1/128 s, and the number of photons incident on the APD 302 in this predetermined counting-time is counted to obtain an image signal of one frame. For example, in the case of outputting a moving image having a frame rate of 120 fps or continuous still images, output of images are sequentially performed with the predetermined counting-time being set as the maximum counting-time. Also, in the case of capturing a still image, shooting is completed in one frame. Note that the counting time can be arbitrarily determined within the range of the maximum counting time.

FIG. 8A shows that the APD 302 is supplied with a slope-like potential HVDD that is equal to or higher than the breakdown voltage and attenuate with time. The slope may increase as time passes. In FIG. 8A, since the lower potential HVDD is supplied in a time zone around time tA and the voltage is relatively high, the pixel 203 counts incident photons with high sensitivity (count rate). On the other hand, a relatively high potential HVDD is supplied in a time zone around time tB and the voltage is relatively low, so that the pixel 203 counts incident photons with relatively low sensitivity.

FIG. 8C is a schematic view showing an effect of the third embodiment. For example, due to the relatively high sensitivity (count rate) at time tA, the separation of the pulse waveform with respect to the incident light amount is difficult, which lowers the incident light amount that causes saturation. On the other hand, the light amount that causes saturation can be improved since separation of the pulse waveform with respect to the incident light amount becomes possible at time tB. This can improve the saturation of the count over the entire counting time. Even when photons of less than the saturation light amount are incident, the sensitivity can be compensated at time tA.

It is also possible to correct an image signal output by driving the image sensor 103 by acquiring in advance the sensitivity (count rate) and the change of the saturation light amount due to the change of the potential HVDD with respect to time. Alternatively, the characteristics of the potential HVDD may be changed every frame or every predetermined counting time.

FIG. 8B shows an example in which a Gated Geiger Mode (GGM) method in which a reverse bias voltage equal to or higher than the breakdown voltage is applied in a pulse form to the APD is applied to the example shown in FIG. 8A. The GGM method is a technique of AC modulating a reverse bias voltage in binary fashion with an amplitude of, for example, 1V or more by controlling a gate cycle, to which the reverse bias voltage is applied, to 10 ns, for example. At this time, assuming that the counting time is Tv=1/128 s, the count saturation is expressed as $(1/128 \text{ s})/(10 \text{ ns}) \approx 7.8 \times 10^5$. The applied reverse bias voltage is above the breakdown voltage at the highest and is below the breakdown voltage at the lowest.

In general, the GGM method is used for the purpose of stopping avalanche breakdown when APD breaks down and photocurrent flows. In addition, by using the GGM method, it is possible to measure the number of incident photons in time division by voltage modulation.

Although the saturation of the count can be regulated by the voltage modulation frequency of the GGM method, when the potential HVDD higher than the breakdown voltage is applied, a pulse (dark count) resulting from the dark current or the like can still be generated. Therefore, also in the GGM method, by making the maximum voltage decline as shown in FIG. 8A, it is possible to drive the APD such that the dark count can be suppressed at time tB, and the sensitivity can be compensated at time to even if sufficient sensitivity cannot be obtained at time tB.

Although the power supply wiring in the third embodiment can be configured with one system of power supply wiring, as described in the first and second embodiments with reference to FIG. 6, and FIGS. 7A, and 7B, the power supply wiring may be constituted by a plurality of systems of power supply wiring.

Fourth Embodiment

Next, a fourth embodiment of the present invention will be described. A configuration of an image capturing apparatus 100 and the schematic configuration of an image sensor 103 in the fourth embodiment, too, are the same as those described with reference to FIG. 1 and FIGS. 2A and 2B in the first embodiment, and the description thereof is omitted here.

Figure 9:
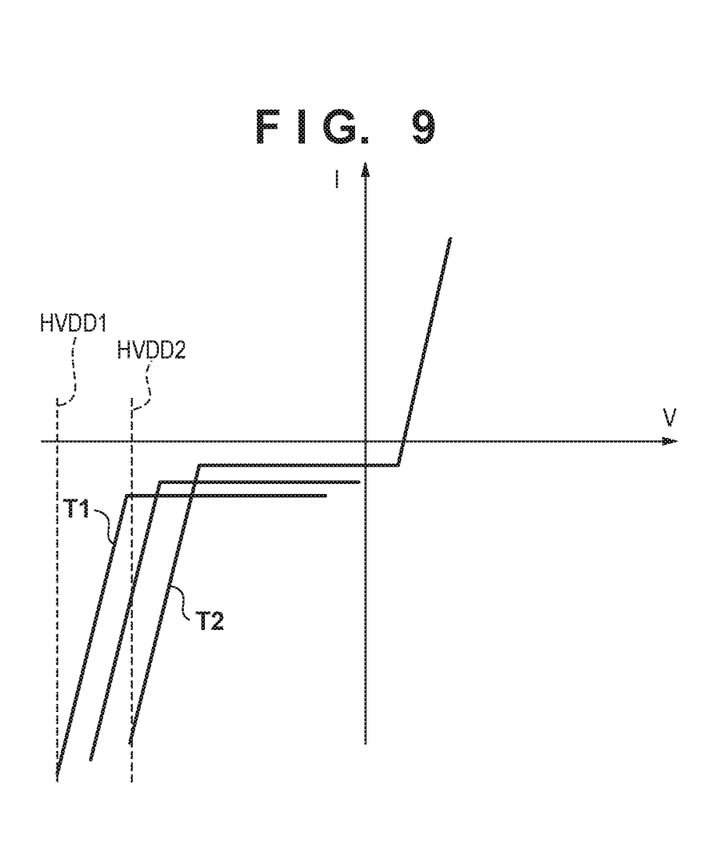
FIG. 9 is a schematic view for explaining relationship between temperature dependency of a breakdown voltage and applied voltage according to a fourth embodiment.

FIG. 9 is a schematic view illustrating the relationship between the temperature dependency of the breakdown voltage of the APD 302 and the applied voltage. As shown in FIG. 9, it is known that, in general, when the temperature T of the APD 302 is low, the breakdown voltage is small (an avalanche phenomenon easily occurs), and when the temperature T is high, the breakdown voltage becomes larger (an avalanche phenomenon becomes less easy to occur).

Here, in a case where the potential HVDD is equal to or higher than a predetermined value, the probability of avalanche multiplication decreases as the temperature rises, and an event in which the output pulse does not reach the threshold value may exist. In order to avoid this, it is conceivable to always apply a low potential HVDD which produces a high voltage that can compensate for the change in the breakdown voltage due to temperature change.

However, since the photocurrent flowing through the APD 302 and the dark current caused by the thermal noise of the carrier increase as the voltage rises, always driving with a high voltage causes an increase in dark count and power consumption.

Accordingly, in the fourth embodiment, as shown in FIG. 9, when the temperature T is low (T=T2), the potential HVDD2 is used, and when the temperature T is high (T=T1), the potential HVDD1 which is relatively lower than HVDD2 is used. Namely, the potential HVDD1 is set to a value such that the voltage is equal to or higher than the breakdown voltage even at T=T1.

On the other hand, the potential HVDD2 does not make a voltage that exceeds the breakdown voltage at T=T1, but sufficiently causes avalanche multiplication when the temperature is T=T2, and is capable of reducing the power consumption of the image sensor 103. With this control, the APD 302 is provided with a temperature measuring element (not shown), and the measured temperature is monitored by the control circuit 106 to determine the potential to be supplied.

As described above, according to the fourth embodiment, even when the temperature of the APD 302 changes, the effect of outputting a preferable image while suppressing an increase in dark count due to dark current and an increase in power consumption or the like can be achieved.

Although the power supply wiring in the fourth embodiment can be configured with one system of power supply wiring, as described in the first and second embodiments with reference to FIG. 6, and FIGS. 7A, and 7B, the power supply wiring may be constituted by a plurality of systems of power supply wiring.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-148020, filed on Aug. 6, 2018 which is hereby incorporated by reference herein in its entirety.

What is claimed is:

1. An image sensor comprising:
a plurality of light receiving elements whose output voltages vary in response to a photon entering;
a plurality of counters each counts a number of events in which the output voltage changes beyond a predetermined threshold, and outputs a count value; and
a voltage source that applies a plurality of different reverse bias voltages which are equal to or higher than a breakdown voltage to the plurality of light receiving elements,
wherein the plurality of light receiving elements are provided with color filters, and the voltage source applies a first reverse bias voltage to the light receiving elements provided with the color filter of a first color, and applies a second reverse bias voltage which is larger than the first reverse bias voltage to the light receiving elements provided with the color filter of a second color which is different from the first color.

2. The image sensor according to claim 1, wherein the color filter is a Bayer array color filter, and the first color is green, and the second color is red or blue.

3. The image sensor according to claim 1 wherein the voltage source applies a first reverse bias voltage to the light receiving elements in a first area, and applies a second reverse bias voltage which is larger than the first reverse bias voltage to the light receiving elements in a second area which is located at a higher image height than the first area, wherein the different reverse bias voltages are applied depending on light receiving efficiency based on an arrangement of the plurality of light receiving elements.

4. The image sensor according to claim 3, wherein the threshold is determined based on dark current which increases as the reverse bias voltage increases.

5. The image sensor according to claim 3 further comprising a signal processor that processes the count values,
wherein the light receiving elements are formed in a first substrate, the counters and the signal processor are formed in a second substrate, and the first substrate and the second substrate are stacked.

6. The image sensor according to claim 3, wherein each of the light receiving elements is an avalanche photodiode operated in Geiger mode, and a quenching resistor is provided between each light receiving element and the voltage source.

7. The image sensor according to claim 1, wherein the threshold is determined based on dark current which increases as the reverse bias voltage increases.

8. The image sensor according to claim 1 further comprising a signal processor that processes the count values,
wherein the light receiving elements are formed in a first substrate, the counters and the signal processor are formed in a second substrate, and the first substrate and the second substrate are stacked.

9. The image sensor according to claim 1, wherein each of the light receiving elements is an avalanche photodiode operated in Geiger mode, and a quenching resistor is provided between each light receiving element and the voltage source.

10. An image sensor comprising:
a plurality of light receiving elements whose output voltages vary in response to a photon entering;
a plurality of counters each counts a number of events in which the output voltage changes beyond a predetermined threshold, and outputs a count value; and
a voltage source that applies a plurality of different reverse bias voltages which are equal to or higher than a breakdown voltage to the plurality of light receiving elements,
wherein the breakdown voltage varies with temperature, and
the voltage source applies a first reverse bias voltage which is equal to or higher than a first breakdown voltage for a first temperature to the light receiving elements in a case of the first temperature, and applies a second reverse bias voltage which is lower than the first breakdown voltage and equal to or greater than a second breakdown voltage for a second temperature to the light receiving elements in a case of the second temperature which is lower than the first temperature.

11. The image sensor according to claim 10 further comprises a temperature sensor that measures temperature.

12. The image sensor according to claim 10, wherein the threshold is determined based on dark current which increases as the reverse bias voltage increases.

13. The image sensor according to claim 10 further comprising a signal processor that processes the count values,
wherein the light receiving elements are formed in a first substrate, the counters and the signal processor are formed in a second substrate, and the first substrate and the second substrate are stacked.

14. The image sensor according to claim 10, wherein each of the light receiving elements is an avalanche photodiode operated in Geiger mode, and a quenching resistor is provided between each light receiving element and the voltage source.

15. An image capturing apparatus comprising:
an image sensor which comprises:
a plurality of light receiving elements whose output voltages vary in response to a photon entering;
a plurality of counters each counts a number of events in which the output voltage changes beyond a predetermined threshold, and outputs a count value; and
a voltage source that applies a plurality of different reverse bias voltages which are equal to or higher than a breakdown voltage to the plurality of light receiving elements; and
a corrector that corrects the count values based on the reverse bias voltage applied to the light receiving elements,
wherein the voltage source applies different reverse bias voltages to the light receiving elements in accordance with white balance gains used in the white balance adjustment.

* * * * *